US011537091B2

(12) United States Patent
Goverde et al.

(10) Patent No.: US 11,537,091 B2
(45) Date of Patent: Dec. 27, 2022

(54) MULTI-SCALE OPTIMIZATION FRAMEWORK FOR SMART ENERGY SYSTEMS

(71) Applicant: IMEC VZW, Leuven (BE)

(72) Inventors: Johannes Goverde, Grimbergen (BE); Francky Catthoor, Temse (BE); Ittetsu Taniguchi, Osaka (JP); Patrizio Manganiello, Hasselt (BE); Daichi Watari, Genk (BE)

(73) Assignee: IMEC VZW, Leuven (BE)

( * ) Notice: Subject to any disclaimer, the term of this patent is extended or adjusted under 35 U.S.C. 154(b) by 1 day.

(21) Appl. No.: 16/928,431

(22) Filed: Jul. 14, 2020

(65) Prior Publication Data
US 2021/0011439 A1    Jan. 14, 2021

(30) Foreign Application Priority Data
Jul. 14, 2019  (EP) .................................... 19186178

(51) Int. Cl.
*G05F 1/66* (2006.01)
*G05B 15/02* (2006.01)
*H02J 3/00* (2006.01)
G06Q 50/16 (2012.01)
G06Q 10/04 (2012.01)
G06Q 10/06 (2012.01)

(52) U.S. Cl.
CPC ............... *G05B 15/02* (2013.01); *G05F 1/66* (2013.01); *H02J 3/003* (2020.01); *G06Q 10/04* (2013.01); *G06Q 10/06* (2013.01); *G06Q 50/163* (2013.01)

(58) Field of Classification Search
USPC ........................................................ 700/286
See application file for complete search history.

(56) References Cited

U.S. PATENT DOCUMENTS

| 2011/0231028 A1 | 9/2011 | Ozog |
| 2013/0138369 A1* | 5/2013 | Papana ................ G01R 31/367 |
| | | 702/63 |

(Continued)

FOREIGN PATENT DOCUMENTS

EP    3576029 A1    12/2019

OTHER PUBLICATIONS

Extended European Search Report, EP Application No. 19186178.0, dated Aug. 12, 2019, 9 pages.

*Primary Examiner* — Emilio J Saavedra
(74) *Attorney, Agent, or Firm* — McDonnell Boehnen Hulbert & Berghoff LLP (57) ABSTRACT

A localized smart energy management system comprises a plurality of controllable loads, at least one intermittent energy source, a selectively connectable dispatchable energy source, and optionally an energy storage system. A method for balancing power production and power consumption of such localized smart energy management systems in real time comprises performing a coarse-grained optimization in a first layer of a hierarchical optimization structure to generate a predicted schedule, based on long-term load demand profiles and long-term power generation profiles. A second layer iteratively refines the predicted schedule upon receiving a new forecast of a short-term power generation profile for the at least one intermittent energy source.

16 Claims, 2 Drawing Sheets

(56) References Cited

U.S. PATENT DOCUMENTS

| | | | | |
|---|---|---|---|---|
| 2014/0058571 A1* | 2/2014 | Hooshmand | ........... | G05B 15/02 |
| | | | | 700/286 |
| 2014/0129040 A1* | 5/2014 | Emadi | .................... | G06Q 50/06 |
| | | | | 700/291 |
| 2014/0350743 A1* | 11/2014 | Asghari | ............... | G05B 13/048 |
| | | | | 700/297 |
| 2015/0019034 A1* | 1/2015 | Gonatas | .................. | H02S 40/38 |
| | | | | 700/291 |

* cited by examiner

MULTI-SCALE OPTIMIZATION FRAMEWORK FOR SMART ENERGY SYSTEMS

CROSS-REFERENCE TO RELATED APPLICATIONS

The present application is a non-provisional patent application claiming priority to European Patent Application No. EP19186178.0, filed Jul. 14, 2019, the contents of which are hereby incorporated by reference.

FIELD OF THE DISCLOSURE

The present disclosure relates to smart energy management systems and methods, in particular to those including renewable energy sources.

BACKGROUND

Smart energy management systems, such as for instance smart buildings or a local electrical vehicle park, are implemented with the goal of optimizing the power supply of appliances, comprising power provided by the grid and power provided by renewable sources of energy, such as solar powered photovoltaic (PV) modules. Yet, it has become clear that harnessing the unpredictability and short-term variability of renewable sources is a difficult task. Smart energy management systems currently rely on the mid-term storage of energy in adequate batteries or similar. Improvements are desirable as this leads to better overall energy efficiency.

SUMMARY

Example embodiments of the present disclosureprovide smart energy management systems capable of both balancing local power production and power consumption in real time.

The above objective is accomplished by a method and device according to the present disclosure.

In a first aspect, the present disclosure provides a method for real-time balancing of power production and power consumption in a localized smart energy management system comprising a plurality of controllable loads, at least one intermittent energy source, and a selectively connectable dispatchable energy source. The method in accordance with embodiments of the present disclosure comprises performing a coarse-grained optimization of long-term average power production by the at least one intermittent energy source, and long-term average power consumption by the loads, over a predetermined planning interval, by using a predicted schedule based on long-term demand profiles of the controllable loads and long-term power generation profiles by the at least one intermittent energy source, iteratively refining the predicted schedule upon receiving a new forecast of a short-term power generation profile for at least one intermittent energy source, a timescale of the long-term actions being at least a factor of ten larger than the timescale of the short-term actions, and using the refined predicted schedule for deciding which ones of the at least one intermittent energy source and selectively connectable dispatchable energy source to connect to the plurality of controllable loads and/or for deciding which ones of the plurality of controllable loads to temporarily disconnect from the system or to power with a different power level.

The localized smart energy management system may further comprise a set of control variables of the energy management system controlling at least the controllable loads and a switch for selectively connecting the dispatchable energy source. In a method in accordance with embodiments of the present disclosure, performing a coarse-grained optimization may comprise:
providing inputs to a first layer of a hierarchical optimization structure, the inputs to the first layer comprising at least a long-term load demand profile for each load and a long-term power generation profile for each intermittent energy source, subject to at least one first optimization constraint for the energy management system and based on the inputs to the first layer, generating a predicted schedule comprising a plurality of checkpoints distributed on a first timescale over a first planning interval and a value of at least one control variable being associated with each checkpoint, iteratively refining the predicted schedule may comprise:
providing inputs to a second layer of the hierarchical optimization structure, the inputs to the second layer comprising at least a short-term power generation profile for each intermittent energy source forecasting, on a second timescale and over a second planning interval, a generated power thereof, wherein a time step of the second timescale is at least ten times smaller than a time step of the first timescale, subject to at least one second optimization constraint for the energy management system and based on the inputs to the second layer, refining the predicted schedule over the second planning interval by relocating at least one checkpoint in the second planning interval on the second timescale and/or adjusting a value of at least one control variable associated with the checkpoint, and iterating the steps c) and d) to progressively advance, for each iteration, the second planning interval on the second timescale by an integer number of time steps of the second timescale and less than a time difference of the second planning interval, and using the refined predicted schedule may comprise:
for each checkpoint of the refined schedule, transmitting the values of the at least one control variable associated with the checkpoint to the loads and switch for selectively connecting the dispatchable energy source corresponding the at least one control variable.

In embodiments of the present disclosure the second planning interval step c) may be an integer multiple of the time step of the first timescale. In alternative embodiments, the second planning interval may be smaller than the first timescale. The second planning interval is mainly related to the accuracy of the fine-grained forecasting: if an accurate forecasting can be obtained within a horizon of 5 minutes, for example, the second planning interval should be about 5 minutes. However, the first timescale can then still be more than 5 minutes (e.g., 15 minutes) for example for fast computation.

In a method in accordance with embodiments of the present disclosure, the time step of the second timescale may be at least hundred times, in some examples at least five hundred times, smaller than the time step of the first timescale, and/or the second planning interval, in step e), may advance on the second timescale by at least ten time steps of the second timescale.

In a method in accordance with any of the previous claims, the localized smart energy management system may furthermore comprise an energy storage system, and refining the predicted schedule may further comprise obtaining power reference curves for at least an overall power consumption by the loads and a power transfer by selectively connecting the dispatchable energy source, and optionally for a power transfer to or from the energy storage system, in accordance with the predicted schedule and each power reference curve defining a plurality of power reference values on the first timescale and over the first planning interval. In embodiments of the present disclosure, the at least one second optimization constraint may comprise a boundary matching term for matching of the power reference values of at least one power reference curve obtained in accordance with the predicted schedule and the refined schedule, respectively.

A method in accordance with embodiments of the present disclosure, wherein the smart energy management comprises an energy storage system having a state of charge and a set of control variables for controlling supplying power to the energy storage system for increasing the state of charge and extracting power from the energy storage system for decreasing a state of charge, may further comprise:

providing a physically accurate model for the energy storage system, each time the second planning interval is advanced in step e), obtaining, e.g. by simulating or measuring, an initial state of charge for a next iteration under step e) based on the refined schedule for a current iteration under step e), and applying the obtained initial state of charge as a further input to the second layer for a next iteration thereof.

In embodiments of the present disclosure, update of the state of charge can be done using simulations or measurements (this latter one meaning obtaining the state of charge coming from a different part of the system (e.g., a battery management system (BMS)) if available). Evolution of the state of charge may be utilized to iteratively run the optimization, in case a storage system is present. Basically, the upper layer executes the optimization from time "X" to, for instance, time "X+24 h" knowing the initial state of charge at time "X". A simulation allowing the calculation of a state of charge trajectory may be utilized if the state of charge is not available from a different source (e.g., a battery management system implemented on board of the battery system might provide this value)

A method in accordance with embodiments of the present disclosure may further comprise:

each time the second planning interval has progressively advanced by a time period equal to the second planning interval, obtaining, for example by measurement or simulation, an adjusted state of charge for a next iteration of the first layer based on the refined schedule for a current iteration under step e), applying the adjusted state of charge as a further input to the first layer for a next iteration thereof, iterating all the preceding steps a) to k) to progressively advance, for each iteration, the first planning interval on the first timescale by one time step of the first timescale.

In a method in accordance with embodiments of the present disclosure, obtaining an initial state of charge or an adjusted state of charge may be done by simulating an evolution of the state of charge of the energy storage system, the evolution of the state of charge of the energy storage system being modeled by a physically accurate model. The physically accurate model is a physics-based model, as for instance the single-particle model based on "Butler-Volmer kinetics" and "Fick's law of diffusion". The physically accurate model may be a nonlinear equivalent circuit model. However, the present disclosure is not limited thereto. Other models that are even more accurate than the equivalent circuit model could be applied.

A method in accordance with embodiments of the present disclosure may further comprise the step of purchasing energy from or selling energy to a utility grid as dispatchable energy source, a price of the energy to be purchased or sold either being fixed or varying dynamically, and wherein purchasing or selling of energy is taking into account the energy price, e.g. a dynamic energy pricing model.

In a method in accordance with embodiments of the present disclosure, the at least one first optimization constraint may comprise an energy reduction term for the energy purchased from the utility grid, and/or a model for the energy storage system to extend the lifetime of an energy storage device forming part of the energy storage system according to embodiments of the present disclosure. The model may take into account protection of the energy storage system against overloading or complete depletion, and/or matching of a loading or discharging profile to a desirable loading or discharging profile, even when limits are not yet reached. The model can for instance be a set of analytic equations or a curve stored in a look-up-table defining the desired profile. Typically this will define a "relative trend" and not an absolute set of values.

In a method in accordance with embodiments of the present disclosure, providing a short-term power generation profile for each intermittent energy source may comprise measuring a local environmental variable, an internal variable of the intermittent energy source, or both, and applying a forecasting model to the measured local environmental variable, to the measured internal variable of the intermittent energy source, or to both.

In a second aspect, the present disclosure provides a smart energy management system for locally balancing energy production and consumption in real time, comprising a plurality of controllable loads, at least one intermittent energy source, and a selectively connectable dispatchable energy source, a set of control variables of the energy management system controlling at least the controllable loads, and a switch for selectively connecting the dispatchable energy source, the energy management system further comprising a processing unit adapted for carrying out at least the steps of any of the methods in claims 1 to 10.

In a system in accordance with embodiments of the second aspect of the present disclosure, the at least one intermittent energy source may be a renewable energy source such as a photovoltaic module or a wind turbine.

A system in accordance with embodiments of the second aspect of the present disclosure may further comprise an energy storage system including one or more of the group of a battery, a supercapacitor, a fuel cell, a heat converter, a flying wheel, a water reservoir, an air compressor.

A system in accordance with embodiments of the second aspect of the present disclosure may further comprise at least one sensor for measuring at least one local environmental variable or at least one internal variable of an intermittent energy source, the processing unit further being configured for performing the method steps of claim 10.

In a third aspect, the present disclosure provides a smart building, smart city cell, or smart vehicle, or smart company plant, or smart car park maintenance comprising the system according to embodiments of the second aspect of the present disclosure.

Example embodiments of the present disclosure that a holistic approach to the energy management system is at the basis of an energy optimization of the entire energy management system rather than the mere optimization of sub-systems thereof.

Example embodiments of the present disclosure provide considerable savings of energy purchased from a grid provider can be obtained.

Example embodiments of the presesent disclosure provide a lifetime of an energy storage system can be extended by reducing undue recharge cycles.

Example embodiments of the present disclosure provide energy production and consumption can be balanced locally also for intrinsically intermittent renewable energy sources, enabling desirable energy utilization. Multiple energy targets can be formulated for an energy management system for optimization.

Example embodiments of the present disclosure are efficiently cope with multiple characteristic time scales of the energy management system, whereby excessive computational time and processing resources are avoided. This enables the application to mobile and immobile systems such as smart vehicles and smart buildings.

Example embodiments of the present disclosure provide system components which may be described in a generic way at a high level of abstraction, which simplifies the integration of and adaption to new technologies such as new batteries. Embodiments of the disclosure can be integrated with many different system architectures and can work with or be extended to a very large number of connectable loads.

Example embodiments of the present disclosure provide bidirectional communication with a smart grid for better demand/response predictability for smart grid providers can be implemented.

Example embodiments of the present disclosure provide an accurate, fine-grained modelling of a battery of an energy storage system is affordable.

Example embodiments of the present disclosure are reactive to environmental changes, for example by collecting sensor data.

Example embodiments of the present disclosure provide an open system that is scalable to multiple interacting agents operating at larger distances and sharing or exchanging generated and/or stored energy.

Particular aspects of the disclosure are set out in the accompanying independent and dependent claims. Features from the dependent claims may be combined with features of the independent claims and with features of other dependent claims as desired and not merely as explicitly set out in the claims.

For purposes of summarizing the present disclosure, certain aspects of the disclosure have been described herein above. Of course, it is to be understood that not necessarily all such aspects may be achieved in accordance with any particular embodiment of the disclosure. Thus, for example, those skilled in the art will recognize that the disclosure may be embodied or carried out in a manner that achieves aspects as taught herein without necessarily achieving other aspects as may be taught or suggested herein.

The above and other aspects of the disclosure will be apparent from and elucidated with reference to the embodiment(s) described hereinafter.

BRIEF DESCRIPTION OF THE FIGURES

The above, as well as additional, features will be better understood through the following illustrative and non-limiting detailed description of example embodiments, with reference to the appended drawings.

All the figures are schematic, not necessarily to scale, and generally only show parts which are necessary to elucidate example embodiments, wherein other parts may be omitted or merely suggested.

DETAILED DESCRIPTION

Example embodiments will now be described more fully hereinafter with reference to the accompanying drawings. That which is encompassed by the claims may, however, be embodied in many different forms and should not be construed as limited to the embodiments set forth herein; rather, these embodiments are provided by way of example. Furthermore, like numbers refer to the same or similar elements or components throughout.

The present disclosure will be described with respect to particular embodiments and with reference to certain drawings but the disclosure is not limited thereto but only by the claims.

It is to be noticed that the term "comprising", used in the claims, should not be interpreted as being restricted to the means listed thereafter; it does not exclude other elements or steps. It is thus to be interpreted as specifying the presence of the stated features, integers, steps or components as referred to, but does not preclude the presence or addition of one or more other features, integers, steps or components, or groups thereof. Thus, the scope of the expression "a device comprising means A and B" should not be limited to devices consisting only of components A and B. It means that with respect to the present disclosure, the only relevant components of the device are A and B.

Reference throughout this specification to "one embodiment" or "an embodiment" means that a particular feature, structure or characteristic described in connection with the embodiment is included in at least one embodiment of the present disclosure. Thus, appearances of the phrases "in one embodiment" or "in an embodiment" in various places throughout this specification are not necessarily all referring to the same embodiment, but may. Furthermore, the particular features, structures or characteristics may be combined in any suitable manner, as would be apparent to one of ordinary skill in the art from this disclosure, in one or more embodiments.

Similarly it should be appreciated that in the description of example embodiments of the disclosure, various features of the disclosure are sometimes grouped together in a single embodiment, figure, or description thereof for the purpose of streamlining the disclosure and aiding in the understanding of one or more of the various inventive aspects. This method of disclosure, however, is not to be interpreted as reflecting an intention that the claimed disclosure includes more features than are expressly recited in each claim. Rather, as the following claims reflect, inventive aspects lie in less than all features of a single foregoing disclosed embodiment. Thus, the claims following the detailed description are hereby expressly incorporated into this detailed description, with each claim standing on its own as a separate embodiment of this disclosure.

Furthermore, while some embodiments described herein include some but not other features included in other embodiments, combinations of features of different embodiments are meant to be within the scope of the disclosure, and form different embodiments, as would be understood by those in the art.

It should be noted that the use of particular terminology when describing certain features or aspects of the disclosure should not be taken to imply that the terminology is being re-defined herein to be restricted to include any specific characteristics of the features or aspects of the disclosure with which that terminology is associated.

In the description provided herein, numerous specific details are set forth. However, it is understood that embodiments of the disclosure may be practiced without these specific details. In other instances, well-known methods, structures and techniques have not been shown in detail in order not to obscure an understanding of this description.

A "localized" smart energy management system, in the context of the present disclosure, relates to a smart energy management system that occupies a delimited surface area of generally less than 10 km$^2$, in some examples less than 1 km$^2$, such as for instance less than 1 ha.

A "smart" energy management system, in the context of the present disclosure, relates to an energy management system that is responsive to sudden short-term variations in the local power production by an intermittent energy source and in the power consumption by loads. This responsiveness follows a requirement for optimality in the form of a cost function or in the framework of a multiple-objective optimization, and also takes into account the cooperative potential of flexible loads in the system. In particular, the responsiveness is not restricted to a connection to or disconnection from a utility grid to compensate for fluctuations in the power production or load demand.

Figure 1:
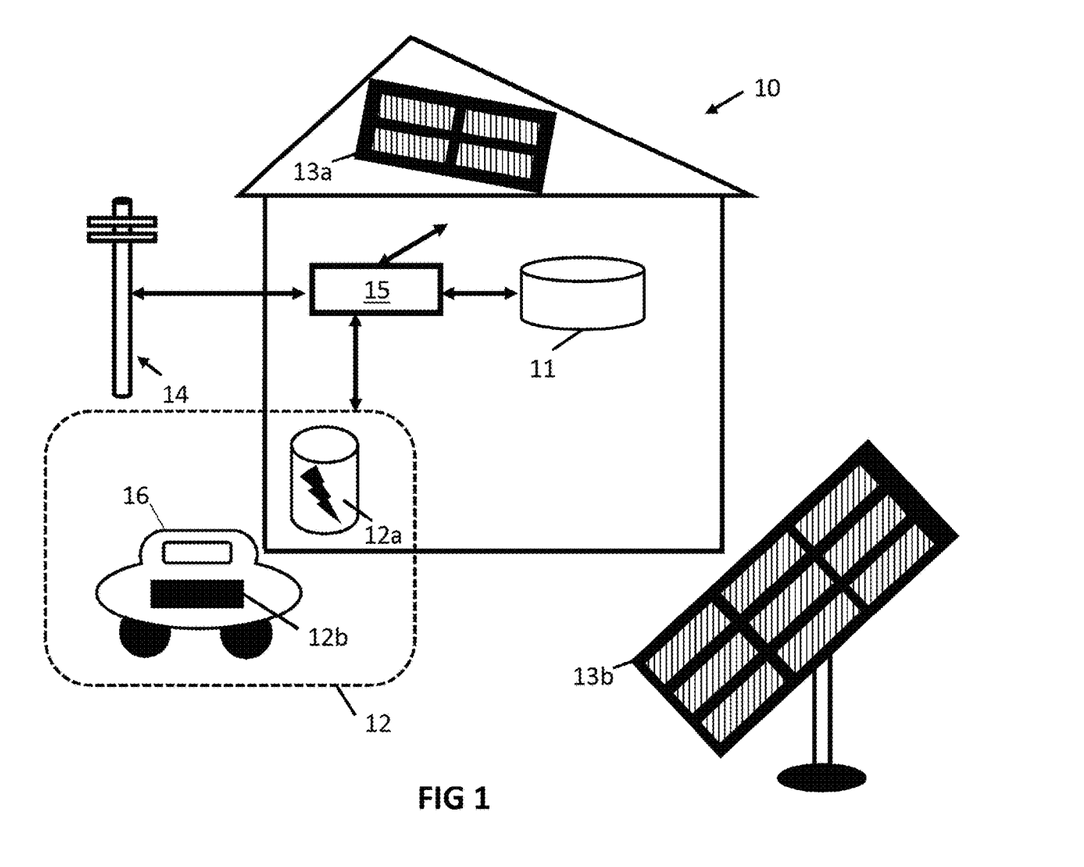
FIG. 1 shows a smart energy management system that is adapted for performing a real-time power balancing method in accordance with embodiments of the present disclosure.

With reference to FIG. 1, a first embodiment of the present disclosure is described. A localized smart energy management system 10 is shown as a residential unit, comprising, for example, a building with garden. It comprises a PV system 13a-13b, for example, comprising rooftop-mounted PV modules 13a and a standalone PV module 13b (e.g., a photovoltaic car shade), as intermittent renewable energy source which generates usable electric power from available solar power. The building is selectively connectable to an electric utility grid 14, for example to a distribution grid of an electricity network. The electric grid 14 constitutes, by virtue of the dispatchable power plants sustaining power delivery via the electric grid, a dispatchable energy source for the smart energy managing system 10. Power generated by the PV system 13a-13b is made available for consumption to a plurality of selectively connectable loads 11 associated with the building, for example via a house wiring network. The plurality of loads 11 associated with the building may include household appliances (e.g., dishwasher, tumble dryer, HVAC, stove), lighting, and consumer electronics. They are selectively connectable to a microgrid (e.g., the building wiring network) of the energy management system 10 via controlled switches. A solar tracking system for tilting the PV system's standalone solar panels 13b to follow the sun may itself be a load. In some examples, an energy storage system 12 also forms part of the smart energy management system 10. It comprises any suitable energy storage system 12, such as, for instance, but not limited thereto, a supercapacitor or a hydrogen-based energy storage system. In the example illustrated, the energy storage system includes one or more rechargeable batteries or battery packs 12a-b, which may also include a vehicle's battery 12b of a vehicle 16 that is used by occupants of the building (inhabitants or employees) and regularly parked near the building or in an extension thereof (e.g., garage). A battery 12a-b of the energy storage system 12 may be connected to the house wiring network via a charge regulator to regulate the battery's charging and discharging currents so as to prevent overcharging and deep discharging, which could damage the battery or reduce the battery lifetime. In embodiments of the present disclosure, the energy storage system 12 can be connected to the utility grid 14, so that power stored in the energy storage system (e.g., in the battery) can be sold to the grid 14 for financial convenience. This decision of selling of energy or not will depend on an implemented (multi-)objective function. This may be particularly relevant if a dynamic pricing scheme is put in place.

At least one processing unit 15 is operatively connected to the loads 11, for example by a wireless communication network or via the building wiring network, and is configured for performing a power balancing method in real time as will be described further below. A charge regulator for the battery may be implemented as a circuit which is included in the at least one processing unit 15.

It may be desirable to store a surplus of generated power from the PV system 13a-13b within the energy storage system 12, for example by charging the batteries 12a-b, for a later reuse at a time where the intermittency of the PV system 13a-13b does not allow for a sufficient power production to match the power demand by the loads 11. For instance, during cloud occlusions, in the evening, or at night, the power generated by the intermittent PV system 13a-13b may be too low to balance the power demand of the loads 11, in which case the stored energy of the energy storage system 12 is released and used to balance power production and power consumption, for example by discharging the one or more batteries 12a-b. If bringing in the energy storage system 12 is not enough to ensure power balancing, for example in case of insufficient power delivery capacity or in case of a too low charge state of one or more batteries 12a-b, the connection to the utility grid 14 as dispatchable energy source may be made effective and the power that is lacking to match the load demand is purchased. The PV system 13a-13b may further be grid-connected, for example through a solar inverter, to divert excess power to the utility grid 14 (e.g. by selling to the grid).

The amount of power generated by the PV system 13a-13b is strongly affected by the naturally occurring phenomena at different time scales which influence the incident solar irradiance. Long-term variations, such as the seasonally varying daytime duration, the average daily sunshine hours (e.g., bright sunshine duration), or even the daily changing solar elevation angle, are causing changes in the power generation of the PV system 13a-13b that are generally predictable to a high degree of confidence. Predictions or forecasts for the long-term power generation profiles of the PV system 13a-13b on slowly varying timescales (e.g., tens of minutes or more) can be obtained from recorded solar irradiance measurement statistics, for example via historical solar irradiance data provided by meteorological measurement stations or via previous day power generation monitoring performed within the PV system 13a-13b itself (e.g., solar irradiance sensor), optionally combined with one day ahead weather forecast information. Occlusions from other buildings, trees, etc., can be accounted for as well, for example, by way of characterizing the PV system 13a-13b during or following the installation, by way of estimation based on skyline silhouette images. Short-term variations on the contrary are far less predictable and occur at faster timescales (e.g., milliseconds to seconds to minutes). Weather conditions in general, and the degree of cloudiness and wind in particular, are mainly contributing to the unpredictable behavior of the intermittent renewable energy source. But also, shadowing of the PV system 13a-13b by moving or quasi-stationary objects, which include birds, foliage, airships, cranes, and the like, are causing momentarily drops in the power generation of the PV system 13a-13b. Therefore, the short-term variations continuously cause fluctuations in the power production about the long-term trend, which has a negative impact on the balancing of power production and power consumption. Falling short on power generated by the at least one intermittent energy source for consumption by the plurality of loads often leads to an additional transfer of power from the utility grid 14 as dispatchable energy source to satisfy the load demand. This incurs additional costs for buying energy from the utility grid. Similarly, an excess in power production by the at least one intermittent energy source may be too large to be consumed by the loads, which excess may then be fed into the utility grid and possibly bought back later at a higher price. Sometimes the excess in power production is even too high to be injected into the grid (due to grid regulations and/or limitations), in which cases the energy may be wasted.

The uncertainty on the power production by intermittent energy sources at shorter timescales is not restricted to PV systems only, but also other renewable energy sources such as, for example, wind energy generated by wind turbines and to a lesser extent tidal power generation. Since the at least one intermittent energy source is generating power locally, and possibly in multiple locations for distributed sources, it is subject to the short-term environmental variations (e.g., weather) in that specific area. The complexity of and computation time for continued power production forecasting is growing in embodiments of the disclosure for which the intermittent energy sources are distributed over a larger area such that the smart energy management systems are reasonably localized in space, for example extending over less 10 km', in some examples less than 1 km', for instance less than 1 hectare (ha).

The power demand of the plurality of loads are also predictable at a coarse-grained timescale, for instance as the average hourly power consumption over a one day period, which also shows characteristic long-term variations. For example, in residential housings or office buildings, a day-night variation in power consumption by the loads is generally observed, or a seasonal variation with more heating in the winter and more cooling in the summer. The average hourly power consumption over a one day period may be available via studies or via statistics collected by the energy management system itself, for example by monitoring average consumption with a power meter or by monitoring the power consumption of individual loads. Generally, the power demand by the loads will depend on the number of occupants in the smart energy management building or number of users of the smart energy management system. Therefore, in embodiments of the disclosure, the number of occupants/users may be monitored, or is determined in advance. Once the number of occupants/users is determined, in some examples in combination with their preferences and/or user behavior, and a record list of all the available loads, or at least of the available most significant loads (e.g., most frequently used and/or most power-consuming loads), has been established (e.g., smart loads communicating their presence and specifications to a processing unit), long-term power demand profiles can be generated in respect of each load.

However, the power demand of the plurality of loads is also following short-term variations, which are less predictable. For example, additional lighting may be used if daylight suddenly drops in the event of large clouds passing by, or visitors plug in their consumer electronics or electric vehicles for charging in an office building. Although preferences of the occupants may be determined in advance, for example by selecting amongst predefined user profiles for an appliance (e.g., temperature set-points for HVAC, spinning speed of a washing machine, etc.), or may be obtained by monitoring, individual beings may occasionally feel discomfort (feeling cold or hot at the usual HVAC temperature if sick, feeling annoyed by noise level of spinning washing machine when working, etc.) and perform active load regulation of one or more loads.

Moreover, in a smart energy management system, one or more loads are flexible loads. That is, these loads are responsive to power supply-demand variations, for example by increasing or decreasing a variable load stepwise or continuously in case of power supply shortages, respectively. Here, the supply of power refers to power generated locally by the intermittent energy source and/or the power supplied by a connection to the utility grid. For example, lightings may be dimmed within the users' comfort zone if the power generated by the intermittent energy source, for example the PV system 13a-13b, drops due to cloud occlusions, or a refrigerator or heating system may cool or heat more intensively in the morning hours when an active working population is predominantly displacing from home to work thereby consuming less grid power, and store an excess thermal energy (heat) in a heat reservoir (e.g., thermal storage system, including inertia of building walls, hot water tanks, stratified tanks, phase change materials) for a gradual and/or controlled release later on. Yet other loads, such as a security or surveillance system, may work in permanence. Some flexible loads, and non-flexible loads too, may also be shifted in time, for example are shiftable loads. Examples hereof include task-related appliances, for instance a washing machine or tumble dryer that are programmed to perform a washing cycle or drying cycle during the day, but the exact timing of a starting time of which can be shifted to an earlier or future time of the day. An alternative example is the case of charging a vehicle. Charging the vehicle will not always be feasible at night, and depending on the vehicle usage more or less flexibility will be available in a particular day or time slot. Some loads, for example appliances, may even allow their processes to be interrupted and resumed later on. For example, the charger for a consumer electronics article such as a handheld electronic camera may progressively charge a battery of this article with moments during which the battery of the article is not charged.

All these short-term variations, constraints and offered flexibility of loads, and optionally also the (dynamic) pricing model for the utility grid, have to be taken into account when optimally balancing power production and power consumption in a real-time power balancing method in accordance with embodiments of the present disclosure.

Figure 2:
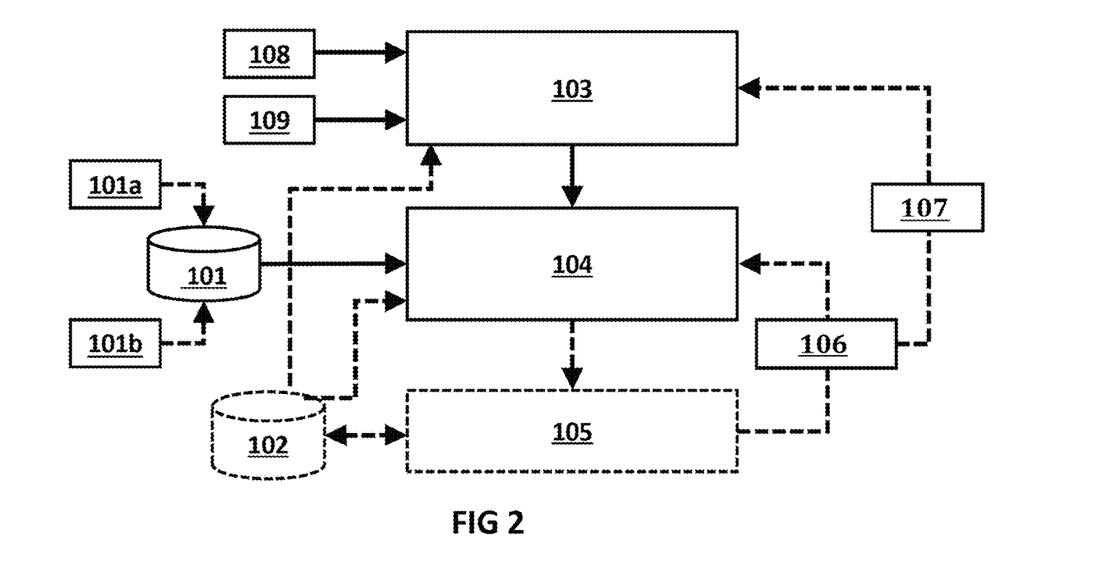
FIG. 2 is a flowchart explaining steps of a real-time power balancing method according to an embodiment of the present disclosure.

With reference to FIG. 2, such real-time power balancing method is now described as can be used and implemented in smart energy management systems according to the disclosure. The balancing method can be a computer-implemented method comprising instructions that are executed on one or more processing units, such as controllers, custom-designed computation hardware (e.g., ASICs), distributed computing systems, or client-server computation systems. In embodiments of the disclosure in which the real-time power balancing method samples or resolves power fluctuations, or power-related aspects (e.g., target output power updates for a battery), at time steps on the order of one second, the energy management system typically includes the processing unit on-site, i.e. the method is locally deployed to minimize latencies and to enable real-time operation, for example react in real time by switching loads on or off in real time, controlling variable loads in real time, connecting or disconnecting to the utility grid in real time, or connect or disconnect the energy storage system, for example the one or more batteries, in real time to store power generated in excess or release stored energy to compensate for power fluctuations. Embodiments of the present disclosure solve the problem of balancing short-term power fluctuations, wherein power generation fluctuations as well as power demand fluctuations are concerned, by a hierarchical power balancing method operating at different planning time intervals/horizons, and at multiple timescales, i.e. at least two different timescales, in particular a coarse-grained timescale and a fine-grained timescale. Here, a time resolution, for example a time step used for optimization, of the coarsest of the multiple timescales is at least a factor of ten larger than the time resolution of the finest of the multiple timescales, and in some examples, is at least a factor of hundred to thousand larger than the time resolution of the finest of the multiple timescales. According to the hierarchical approach, a first, upper optimization layer 103 of the hierarchical method is dealing with the more accurately predictable long-term variations of the power production by the intermittent energy source and the long-term power demand profiles of the plurality of loads (e.g., statistics on the usual, recurrent, or average power consumption of the plurality of loads). Accordingly, the first layer 103 optimizes the long-term average power production and long-term average power consumption over a predetermined planning time interval to be balanced in first approximation in respect of the first, coarse-grained timescale. Optimized long-term planning is carried out by the first layer 103 under a first optimality constraint (e.g., an objective or cost function to be minimized or maximized within tolerance margins). The objective or cost function may include optimization (e.g., a minimization within tolerance margins) of the purchasing cost for energy supplied by the utility grid, a minimization within tolerance margins of the user/occupant discomfort, a minimization within tolerance margins of equivalent $CO_2$ emissions, or combinations thereof. For instance, the first layer 103 may be formulated in the framework of a multiple-objective optimization problem for which both the purchasing cost for energy supplied by the utility grid and a battery lifetime or PV system maintenance cost are optimized within tolerance margins in unison. Moreover, the optimization in the first layer 103 takes into account the discrete, many-valued, or continuous control variables associated with the plurality of loads and the energy storage system, for example discrete control variables associated with the on/off switching of a load, many-valued control variables associated with stepwise adjustable loads or charging currents (e.g., discrete temperature steps for temperature set-points when adjusting HVAC systems, stepwise adjustable charging current of a battery of the energy storage system), or continuous control variables associated with continuously adjustable loads (e.g., dimming of lighting), respectively. Ideally, the first layer 103 also implements, next to the power balancing constraint, the upper and lower control limits for the plurality of loads and the energy storage system as additional constraints, for example overpower protection of loads, deep discharging avoidance for batteries of the energy storage system, etc. The constraints can be under the form of a model, which can for instance be a set of analytic equations or a curve stored in a look-up-table defining the desired profile. In some scenarios, this will define a "relative trend" and not an absolute set of values. As the first layer 103 acts as a prediction layer for the reactive lower layer 104 in the hierarchy, the additional constraints may be formulated as hard constraints and/or relaxed constraints such that a violation of a constraint in the first approximation is tolerable because the violation can still be corrected by the lower layer 104. Additionally, the shiftable or interruptible character of some loads is handled by the first layer 103. For instance, completion of interruptible load processes can be guaranteed by a hard constraint according to which the summed time periods for partial completion have to result in the total process time specified by the load. Loads that are not shiftable, for example, can be assigned a predetermined time slot along the coarse-grained timescale, which can be assigned according to user preferences.

To be able to determine the first order approximation under a predetermined optimality constraint, the load profile for each of the plurality of loads is provided as input to the first layer 103 in a step 108 of the method. As previously mentioned, each load profile comprises the long-term demand profile of the load, which may be obtained by previous studies or on-site monitoring, user-defined preferences (e.g., for user comfort or for possible shiftable starting times) if available, and a load specification, for example a set of associated control variables and their type and ranges (binary, integer with upper/lower bounds, etc.). Alternatively, or additionally, load models may be provided for one or more loads, which, based on the previously obtained demand profiles and optionally on further user input and/or pricing models of the utility grid, determine a forecast for the load demand profile over the planning period of the first layer 103.

Similarly, a power generation profile for each intermittent energy source forecasting the source's power generation over the planning period of the first layer 103 is provided as input to the first layer 103 in a step 109 of the method. The power generation profile for each intermittent energy source may be obtained from monitored historical data, for example from the last years' power generation profile, or may be obtained from the power generation profile of the preceding planning period (e.g., the day before) in combination with weather forecast data (e.g., satellite data, meteorological data, sky imagers) for the localized area where the energy management system is located. Prediction models forecasting the power generation profile of one or more intermittent energy sources may also be employed. These prediction models, and also the load models, may be run locally on a processing unit of the energy management system or may be executed remotely, for example as a server application. It is convenient to provide the power generation profile for each intermittent energy source with the same coarse-grained timescale over the planning time interval that is used by the first upper layer 103, or vice versa, it is only meaningful to optimize in the first layer 103 for coarse-grained timescales that reflect the more predictable long-term variations of the at least one intermittent energy source since the unpredictable short-term variations will certainly cause deviations from the approximate solution determined by the upper layer 103 if computed for a too fine time resolution.

If in particular embodiments of the disclosure, an energy storage system, for example comprising one or more batteries and/or rechargeable fuel cells, is also forming part of the smart energy management system, a set of energy storage models, such as a set of battery models or a set of fuel cell models 102 is provided to simulate a state of charge of the energy storage system, for example battery/fuel cell, under a sequence of charging and discharging steps. The set of energy storage models may include both simplified and complex storage models that can be used in the different layers.

The coarse-grained optimization (e.g., obtaining a first order optimal solution) may be performed in two steps by the first layer 103 and an associated solver module: a first step of appliance scheduling, where a simplified (e.g., linear) model of the energy storage system may be used to reduce the computational burden, and a second step of coarse-grained state-of-charge (SoC) trajectory optimization, where the SoC is optimized with coarse-grained (e.g., 15 minutes) resolutions. These values will then be used further as reference values for the fine-grained optimization. In some examples, the time and computational power required for obtaining a first approximate solution may be drastically reduced (e.g., by using linear optimization techniques rather than nonlinear optimization techniques).

The first layer 103 may then perform the long-term, coarse-grained optimization by submitting the optimization problem, including all the constraints, to an associated solver module. A solver of the solver module may be a known integer or mixed-integer optimizer, for example an optimizer using one or more of linear (simplex) or quadratic programming, convex programming, integer programming, nonlinear programming, stochastic programming. For a given planning interval/horizon, the more loads are present and the finer the time step is chosen for optimization, the harder it is to solve the optimization problem. Also, any nonlinearity, including integer constraints and nonlinear battery/fuel cell models, adds to the complexity of the problem. Therefore, it is generally advisable to relax, at least partially, some of the nonlinearities, for example by linearizing the energy storage system (e.g., battery/fuel cell) model (as discussed above) and relaxing the integer constraints, and to enforce the nonlinear constraints or impose the more accurate nonlinear model for the battery/fuel cell in the lower layer 104 in the hierarchical approach, in which the planning interval is much shorter. In typical applications, a planning horizon may typically be one day long (24$h$) and the coarse-grained timescale may comprise 15 minutes steps as time resolution such that the optimization problem submitted to the solver module is still reasonably tractable. In contrast, the lower layer 104 will then deal with a much shorter time horizon and much finer timescale for reacting to power fluctuations violating the power balancing or a load boundary for safe operation, for example a time horizon of 15 minutes corresponding to the upper layer's 103 time step and a finer-grained timescale comprising 1 sec time steps.

It follows from the previous considerations that the upper first layer 103 provides, in response to a solution found by the solver module, a predicted schedule as output. The predicted schedule comprises a plurality of checkpoints in time which indicate a change in a control variable of one or more loads and/or a change in the connection state to the utility grid and/or predicted average load demand. A change of a control variable for a load may be sent to the load directly which, in response thereto, adjusts its variable load demand, which includes turning on/off the load. Alternatively, a control circuit of the processing unit may instead interpret a change of a control variable for a load or a change in the connection state to the utility grid to generate a control signal to adjust the variable load, including switching on/off the load, or to connect to/disconnect from the utility grid. In some example embodiments of the disclosure, the predicted schedule further comprises checkpoints indicating a change of a control variable associated with the transfer of energy from the energy storage system, for example a change of a control variable indicating the charging/discharging of a battery or fuel cell, indicating a target output power or charging current in respect of a battery or fuel cell regulator, etc. In other words, the predicted schedule comprises a load schedule, a grid-connectivity schedule, and in some examples also an energy storage schedule. From this predicted schedule, the respective coarse-grained power reference curves for the overall power consumption by the scheduled loads and the power purchase by the scheduled connection to the utility grid are extracted. In some embodiments of the disclosure, also the overall or individual power transfer (storage/release) reference curve(s) by the scheduled energy storage system are extracted, for example individual battery or fuel cell reference curves according to particular embodiments of the disclosure. Each of the power reference curves is extracted in respect of the same planning horizon and the same coarse-grained timescale as used by the upper layer 103, for example for 15 min time resolution and one day planning.

The second lower layer 104 is receiving a portion of each of the power reference curves as input, for instance a portion that corresponds to one time step of the coarse-grained timescale. This portion may contain only the power reference values for a start point of the time interval defined by the time step, or the power reference values for a start point and an end point of the time interval defined by the time step. Alternatively, the second lower layer 104 is receiving a portion of each of the power reference curves that corresponds to multiple, but few (e.g., less than ten) consecutive time steps of the coarse-grained timescale as input. Accordingly, additional power reference values may be obtained at the finer-grained timescale of the second lower layer 104 by assuming a constant power reference throughout the time step of the coarse-grained timescale or by using an interpolation scheme (e.g., linear interpolation, cubic interpolation, multi-point interpolation, etc.) to interpolate between the multiple consecutive power reference values along each curve. The second lower layer 104 then operates on a time horizon that is much shorter than the time horizon for the first upper layer 103, for example the second lower layer 104 operates on a time horizon of 15 min with a fine-grained timescale comprising time steps of 1 sec. The time horizon of the second layer 104 may be equal to the time step of the coarse-grained timescale, but is not limited thereto.

A particularity of the lower layer 104 is that it repeatedly receives short-term power generation profiles for the at least one intermittent energy source as input, for example every ten seconds. In general, multiple successive short-term power generation profiles are received by the lower layer 104 within the time horizon for the lower layer 104.

Each of the successive short-term power generation profiles are provided in a method step 101, for example are computed outputs of a short-term power generation forecast model. One example of such short-term forecast model is described in EP18175427.6, which is incorporated herein by reference. In some examples embodiments of the disclosure, such a short-term power generation forecast model for the renewable energy systems, for example a short-term forecasting model for the power generation by the PV system 13a-13b, receives measurements of local environmental variables as model inputs, and measuring the local environmental variables constitutes an additional method step 101a. Local environmental variables to be measured that may be of interest include solar irradiance, cloud observations (e.g., by sky imagers) wind speed, humidity, air pressure, molecular concentrations of pollutes, etc. These variables may be measured at or close to the at least one intermittent energy source, for example at each intermittent energy source or at regular distances (e.g., every hundred meters). In addition to the measured local environmental variables, a short-term power generation forecast model may receive the real-time monitored power generated by the at least one intermittent energy source as input and/or may read out internal status data for the at least one intermittent energy source in a further step 101b, wherein relevant internal status data may comprise for instance the operating temperature of a PV module (e.g., for determining conversion efficiency), the total operating time since installation or manufacture (e.g., to evaluate aging effects and degradation), internal stresses or deformations (e.g., vibrations of rotor blades), and others.

It is noted that the provided short-term power generation profiles allow for regular updates of the effectively generated power to be communicated to the lower layer 104. It is understood that an update of the "effectively generated power" is obtained as an initial boundary condition for the short-term power generation profiles which is used as departing point for a prediction of the generated power over short time intervals, for example of the order of tens of seconds (e.g., ten seconds) which is fairly close to the effectively generated power (e.g., as could be measured by real-time monitoring) and in any case closer than any interpolated long-term forecast of the power generation profiles would generally achieve.

As a result, the lower layer 104 is adapted to detect and to react to detected short-term imbalances between generated power by the at least one intermittent energy source and power consumption by the loads with a temporal resolution determined by the fine-grained timescale. If imbalances are detected, the second layer 104 reacts so as to compensate for these fluctuations in the generated power, for example by deciding to store excess energy in a battery of the energy storage system or to sell excess energy to the utility grid, by deciding to compensate for a shortfall of power generated by the at least one intermittent energy source by connecting to the utility grid or by discharging a battery of the energy storage system, or by reducing or disconnecting one or more loads. This reaction by decision taking within the second lower layer 104 is involving optimized decision, wherein decisions are optimized over the predetermined time horizon for the lower layer 104, for example over a time span of 15 min. The decisions to be taken are direct consequences of the changes of the control variables that have been previously defined for the predicted schedule at a plurality of checkpoints; these checkpoints are distributed in time according to the coarse-grained timescale. Due to the existence of short-term imbalances the decisions implied by the predicted schedule are sub-optimal. Hence, a subsequent optimization by the second layer 104 is necessary. This subsequent optimization is performed within the second layer 104, which refines the predicted schedule of the first layer 103 over the shorter time horizon of the second layer 104 (e.g., 15 min) and at a fine-grained timescale (e.g., time steps of 1 sec). Refining the predicted schedule comprises relocating checkpoints on the fine-grained timescale and/or re-evaluating the changes of the control variables associated with the relocated checkpoints. Given the restricted number of loads having control variables associated with checkpoints falling within the shorter time horizon of the second layer 104, the complexity of the optimization problem is greatly reduced in comparison to the one for the first layer 103. It is therefore possible to submit the subsequent optimization to a solver module, which uses a solver that copes with the nonlinear constraints (e.g., the integer constraints and, in some examples, also the nonlinearities of the more accurate set of energy storage models, such as set of battery/fuel cell models for a battery/fuel cell that is part of the energy storage system. The non-linear energy storage model may for instance be assumed to be analytic equation-based. To optimize, the solver module uses the energy storage model, which includes non-linearities for the fine-grained optimization. The solver module for the second layer 104 may be the same solver module as for the first layer 103 but configured for use of a different solver, or may be a different solver module. The submitted optimization problem for the second layer 104 is subject to a second optimality constraint, which differs from the optimality constraint of the upper first layer in that it includes additional terms to be minimized. For instance, correction terms that enforce that an overall power consumption in accordance with the refined schedule closely follows the coarse-grained power reference curve for the overall power consumption by the loads, that a power purchase from the utility grid in accordance with the refined schedule closely follows the coarse-grained power reference curve for the purchased power, or that the transferred power of individual battery or fuel cell of the energy storage system in accordance with the refined schedule closely follows the coarse-grained individual battery or fuel cell power reference curves.

The forecasting of short-term power generation profile(s) offers an unexpected solution to the problem of, on the one hand, taking rule-based and sub-optimal decisions if a too frequent real-time measurement of the power generation by the at least one intermittent energy source does not allow for any additional optimization steps within the second layer 104, especially in larger-sized energy management systems comprising many intermittent energy sources and therefore a high input count for real-time measured generated powers, and, on the other hand, obtaining sub-optimal decisions as a result of a too coarse time resolution for optimization in the second layer 104, which accepts a high input count for real-time measured generated powers, but fails to capture brief short-term variations, for example the very fine-grained power fluctuations, and optimize accordingly. Moreover, it is a surprising synergetic effect that the forecasting of short-term power generation profile(s) also enables optimized decision taking by the second layer 104 in respect of the more complex but very accurate nonlinear battery/fuel cell models. Successive forecasted short-term power generation profiles are sufficiently separated in time, for example by approximately ten seconds, to allow the more accurate nonlinear model to run. This more accurate modelling has an important impact on the battery or fuel cell lifetime, which may be extended. It also has an impact on the more accurate evaluation of the battery's or fuel cell's dynamic charging and discharging behavior, including aging and other effects, which reflects in an improved utility grid connectivity schedule that lowers the overall purchasing costs over the planning interval of the first layer 103, for example one day. Which variables to put in the first layer 103 or in the second layer 104 is based on time constants. Renewable energy production and energy storage systems have relatively small time constants, leading to for instance a 1' time step in the lower second layer 104. Both loads and dynamic pricing updates, for instance, have longer time constants In particular embodiments of the disclosure, the time horizon/planning periods for the upper first layer 103 and the second lower layer 104 may be, in some example embodiments, sliding horizons, meaning that an absolute starting time for the time horizon is repeatedly shifted to a future time on the coarse-grained timescale and fine-grained timescale, respectively. The method steps described above are performed again for each new starting time of the sliding time horizon. For instance, the time horizon for the first layer 103 is shifted by one time step of the coarse-grained timescale at every iteration, for example the first layer 103 performs a first approximate optimization every 15 min and generates the corresponding predicted schedule for the next 24 hours with a quarterly hour time resolution. For the second layer 104 it is more adequate to shift the starting time for time horizon for each newly provided short-term power generation profile (e.g., by ten seconds). In consequence, a subsequent optimization is carried out by the second layer 104 every ten seconds and the corresponding refined schedule is generated for the next 15 min with a one second time resolution. For such embodiments it is useful to provide a feedback information at the start of each next iteration. This feedback information can come from simulation or measurements. The feedback information can for instance be the current battery SoC. At time X, the lower layer optimizes from X to X+15 minutes, knowing the initial SoC at time X. If SoC at time X can be measured, for instance by and estimation of SoC(X) coming, for example, from the battery management system (BMS), it can be used to perform the next optimization. Otherwise, it may be evaluated via simulations within the framework.

A state of charge of an energy storage system with respect to the next iteration of the second layer 104 may be simulated during the current iteration step of the second layer. In some examples, energy storage systems are deployed which are partially or fully based on batteries, supercapacitors, or fuel cells as storage medium. At least one of the underlying characteristic times related to charging and discharging effects for these storage media are often of the order of seconds. Neglecting these fast dynamics in a physical simulation model (e.g., in an equivalent circuit model) would result in a less accurate calculation of the initial state of charge at the start of the next iteration of the second layer 104, and ultimately have a negative impact on the precise decision making by the second layer 104, for example increase the costs for purchasing power from the utility grid or shorten the lifetime of the battery, the supercapacitor, or the fuel cell. Accurate modelling of the state of charge can remedy these negative aspects. This accurate modelling and calculation of the state of charge can be done within the framework, or can be obtained, for example from the battery management system.

In FIG. 2, a battery model, for example, a physically accurate model such as for instance, but not limited thereto, a nonlinear equivalent circuit, is provided in step 102. Instead of, or in addition to a battery model, a supercapacitor model or a fuel cell model may be provided. This model is used in a simulator 105, together with the currently refined power transfer schedule for the battery. The simulator then simulates, for each iteration step of the second layer 104, a state of charge evolution for the battery in respect of the next iteration step of the second layer, for example for the next ten seconds. When the second layer 104 initiates the following iteration step, the simulated state of charge evolution is used as to provide an initial state of charge value 106 as input to the subsequent optimization performed by the second layer 104. This guarantees that, next to the updated short-term forecasts for the power generation profiles by the at least one intermittent energy source, also a more accurate state of charge value is used to assist in balancing power production and power consumption. Furthermore, a more accurate state of charge value as obtained by the continued interaction between second layer 104 and simulator 105 may be communicated to the upper first layer 103 as a regular feedback 107, for example every 15 min upon initiating a further iteration of the first layer 103. Other measured quantities characterizing the smart energy management system (e.g., temperature and air humidity), new user input with regard to preferences, and the actual status of the control variables may be provided as additional feedback to the upper first layer 103 at regular intervals (e.g., every 15 min upon initiating a new iteration).

In the foregoing examples, PV systems have been named as an example of the at least one intermittent energy source. Other non-limiting examples for the at least one intermittent energy source include wind turbines, building-integrated photovoltaic systems, solar farms, for example in combination with industrial production sites that are part of the smart energy management system, tidal power, and wave power.

Maximum power point tracking techniques may be used for the at least one intermittent energy source in combination with power balancing methods in accordance with the present disclosure.

An energy storage system may comprise one or more solid-state or liquid batteries, including Nickel-Cadmium batteries, Lithium-ion batteries, molten salt batteries (e.g., sodium-sulphur battery), and flow batteries (e.g., vanadium redox battery). Alternatively, or additionally, the energy storage system may comprise one or more supercapacitors and/or rechargeable fuel cells. Fuel cells for which the fuel is replenished from a stock of fuel may substitute or complement the connection to the utility grid as a dispatchable energy source. The energy storage system may further comprise heat storing elements, for example molten salt tanks, phase change materials, building walls and ceilings, or hot water tanks. The stored heat may be released at a later moment in time, which can further reduce electric power consumptions by electric heating. Stored heat may be converted back to electric power for consumption as well. Other forms of energy storage and release in energy storage systems may comprise compressed air and/or hydraulic energy storage (e.g., pumping water into water towers), or mechanical storage means, such as for instance fly wheels.

Smart energy management systems are not limited to residential buildings and include other types of management systems such as office buildings, housing complexes, a company plant with several buildings, and even small cells of a smart city. Smart energy management systems even go beyond buildings, and can for instance comprise a local electrical vehicle park which may be maintained by a provider which also owns renewable energy sources.

While the disclosure has been illustrated and described in detail in the drawings and foregoing description, such illustration and description are to be considered illustrative or examples and not restrictive. The foregoing description details certain embodiments of the disclosure. It will be appreciated, however, that no matter how detailed the foregoing appears in text, the disclosure may be practiced in many ways. The disclosure is not limited to the disclosed embodiments.

Figure 3:
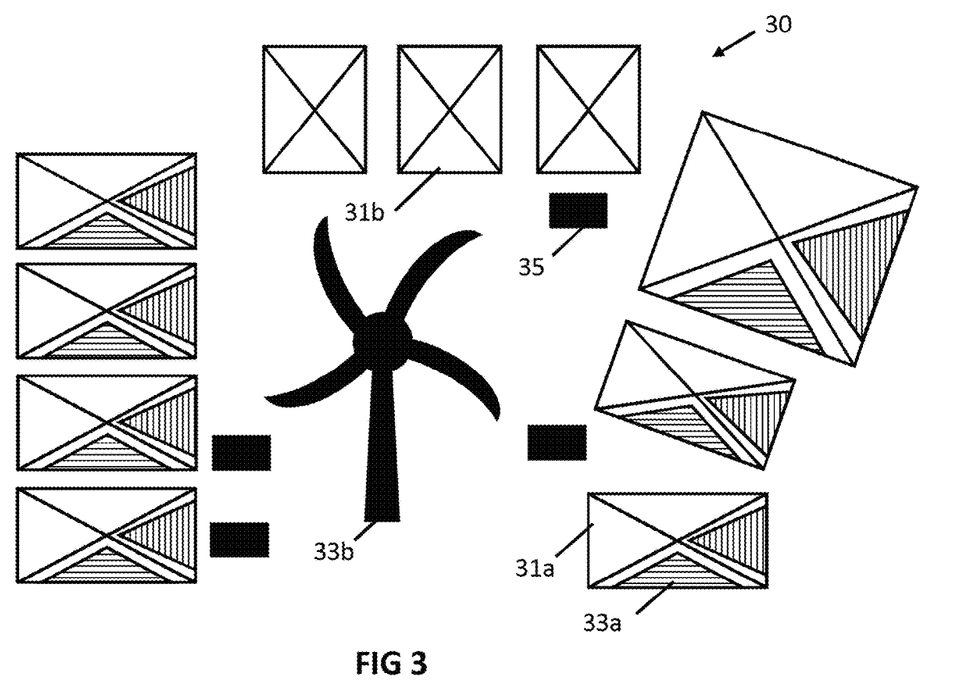
FIG. 3 and FIG. 4 show more examples of smart energy management systems that are adapted for performing a real-time power balancing method in accordance with embodiments of the present disclosure.

Referring to FIG. 3, a smart energy management system 30 according to an embodiment of the present disclosure is illustrated, which is a cell of a smart city. The cell comprises a plurality of buildings 31a-31b and each building comprises various loads. A subset of the buildings 31a are equipped with PV systems 33a as intermittent energy sources. Furthermore, a wind turbine 33b is erected in proximity to the buildings 31a-31b as a further intermittent energy source, which supplies generated power to the buildings 31a-31b, for example via a microgrid, to power the loads therein. A plurality of electric cars 35 are frequently parked within the cell. A battery of each car 35 is part of a distributed energy storage system for the cell. The buildings 31a-31b are also selectively connectable to a utility grid, for example via the microgrid, to have access to the power supply of a dispatchable energy source. This smart energy management system 30 can employ the above-described power balancing methods, for example to reduce the purchased energy cost per building and/or to reduce the carbon footprint of the city's cell.

Figure 4:
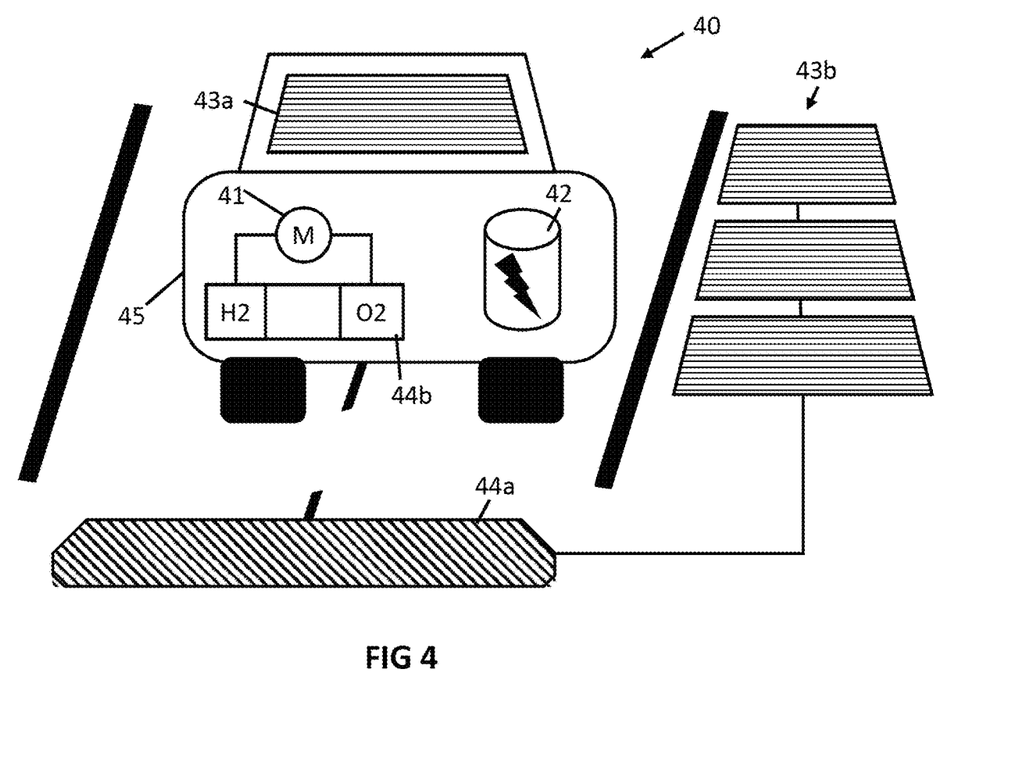

With reference to FIG. 4 yet another embodiment is briefly described, in which the smart energy management system 40 is a mobile or partially mobile system, which comprises a vehicle, for example a car 45, or even a vehicle park as introduced higher up. On board electronics, air conditioning, and consumer electronics of the car 45 are examples of loads which, in addition to the engine 41, require variable amounts of power. The engine, and by extension the whole vehicle, may be electric or hybrid. An internal combustion engine for driving an electric generator of a hybrid vehicle may be supplied with a conventional fuel, for example gasoline, diesel fuel, or hydrogen, at large speeds, and an electric motor directly supplied with electricity at low speeds and/or for acceleration. An electric motor of an electric vehicle is also powered by electricity. This supply of electricity for the loads can be generated by either a PV system 43a which is, for example, installed on the vehicle (e.g., on the roof and/or doors of a car) and/or is part of the vehicle (e.g., integrated in the window glass). The PV system 43a is acting as an intermittent renewable energy source. In addition to the PV system 43a, a plurality of PV modules 43b may be deployed next to a road or integrated into the road to generate a more significant amount of power which can be transferred to the car 45 by means of dynamic wireless power transfer systems 44a. If connected to the utility grid as well, the dynamic wireless power transfer systems 44a may also act as dispatchable energy source. A fuel cell 44b is another example of a dispatchable energy source that is accessible to the car 45 and to which the engine 41 can selectively connect. Power-balancing methods of the present disclosure can be implemented on one or more processing units inside the car 45, inside a plurality of such cars, or inside one or more such cars and as part of the dynamic wireless power transfer systems 44a.

The car 45 also comprises an energy storage system 42 to store (excess of) generated power and/or to release stored energy on demand when balancing the overall system's power production and consumption. For example, the energy storage system 42 may comprise one or more charge storage devices, for example batteries or supercapacitors. The charge storage device(s) can be charged while the vehicle is parked, for example by the PV system 43a or a connection to a utility grid (e.g., via a charging post). Depending on the state of movement of the vehicle, for example driving or parked, the connection to the utility grid via the charging post can constitute an intermittent (since not available during driving) or a dispatchable energy source (when parked), respectively. The vehicle, in a parked state, may still have active loads associated with it, for example air conditioning running or heating/defrost turned on in winter.

A highway wind turbine may convert available wind energy into electricity for powering the loads of passing cars. Moreover, cars may communicate with each other to prioritize the available power generated by the lane-charging system or the wind turbines and deliver it to those cars a battery of which has a low state of charge.

It is also possible to have the electric vehicle forming part of a larger smart energy management system, for instance, an energy management system comprising both the vehicle and a building. Such configuration is often referred to as vehicle to home, in which the vehicle assumes the role of an energy storage device in a parked state. In a smart city, a small cell thereof may use publicly available electric cars (e.g., car sharing services) as part of the energy storage system.

Other variations to the disclosed embodiments can be understood and effected by those skilled in the art in practicing the claimed disclosure, from a study of the drawings, the disclosure and the appended claims. In the claims, the word "comprising" does not exclude other elements or steps, and the indefinite article "a" or "an" does not exclude a plurality. The mere fact that certain measures are recited in mutually different dependent claims does not indicate that a combination of these measures cannot be used. A computer program may be stored/distributed on a suitable medium, such as an optical storage medium or a solid-state medium supplied together with or as part of other hardware, but may also be distributed in other forms, such as via the Internet or other wired or wireless telecommunication systems. Any reference signs in the claims should not be construed as limiting the scope.

While some embodiments have been illustrated and described in detail in the appended drawings and the foregoing description, such illustration and description are to be considered illustrative and not restrictive. Other variations to the disclosed embodiments can be understood and effected in practicing the claims, from a study of the drawings, the disclosure, and the appended claims. The mere fact that certain measures or features are recited in mutually different dependent claims does not indicate that a combination of these measures or features cannot be used. Any reference signs in the claims should not be construed as limiting the scope.

What is claimed is:

1. A computer-implemented hierarchical optimization method for real-time balancing of power production and power consumption in a localized smart energy management system comprising a plurality of controllable loads, at least one intermittent energy source, and a selectively connectable dispatchable energy source, the method comprising:
   in a first, upper layer of hierarchical optimization:
      providing forecasts of long-term demand profiles for the plurality of controllable loads and providing forecasts of long-term power generation profiles for the at least one intermittent energy source, wherein the long-term demand profile and power generation profile are forecasted over a first planning interval;
      solving in a first solver module associated with the first, upper layer of hierarchical optimization a first constrained optimization problem with the provided forecasts of long-term demand profiles and power generation profiles as inputs, thereby generating a coarse-grained predicted schedule comprising a plurality of checkpoints distributed with a coarse temporal resolution determined by a first timescale over the first planning interval, each checkpoint having associated thereto a value of at least one control variable for controlling the plurality of loads and/or a power transfer to the plurality of loads from the selectively connectable dispatchable energy source and/or a power transfer from the at least one intermittent energy source over the first planning interval and with the coarse temporal resolution determined by the first timescale;

extracting, from the coarse-grained predicted schedule, coarse-grained power reference curves for an overall power consumption by the plurality of controllable loads and for the power transfer to the plurality of loads from the selectively connectable dispatchable energy source; and outputting to a second, lower layer of hierarchical optimization, a portion of each of the power reference curves for the overall power consumption by the plurality of controllable loads and for the power transfer to the plurality of loads from the selectively connectable dispatchable energy source; and in the second, lower layer of hierarchical optimization:

providing, to the second, lower layer of hierarchical optimization, multiple successive forecasts of short-term power generation profiles for the at least one intermittent energy source over a second planning interval shorter than the first planning interval;

detecting, within the second planning interval, short-term imbalances between the generated power by the at least one intermittent energy source and power demand by the plurality of loads with a fine temporal resolution determined by a second timescale over the second planning interval, the fine temporal resolution being at least a factor of ten smaller than the coarse temporal resolution;

solving in a second solver module associated with the second, lower layer of hierarchical optimization a second constrained optimization problem with the provided forecasts of short-term power generation profiles, the portions of the coarse-grained power reference curves for the overall power consumption by the plurality of controllable loads and for the power transfer to the plurality of loads from the selectively connectable dispatchable energy source as inputs, thereby iteratively, upon receiving a new forecast of a short-term power generation profile for at least one intermittent energy source, refining the coarse-grained schedule over the second planning interval and thereby generating a fine-grained refined schedule comprising a plurality of checkpoints distributed with the fine temporal resolution determined by the second timescale over the second planning interval, each checkpoint having associated thereto a value of at least one control variable for controlling the plurality of loads and/or the power transfer to the plurality of loads from the selectively connectable dispatchable energy source over the second planning interval and with the fine temporal resolution determined by the second timescale, and compensating, with the fine temporal resolution, detected short-term imbalances by transmitting for each checkpoint of the refined schedule the value of the at least one control variable associated thereto to the one or more loads and/or to a switch for selectively connecting the dispatchable energy source.

2. The method according to claim 1, the localized smart energy management system furthermore comprising a selectively connectable energy storage system with an associated state of charge, the method further comprising:

providing an energy storage model for the energy storage system to simulate the state of charge thereof, wherein the generating portions of the coarse-grained schedules includes generating a coarse-grained schedule for controlling, over the first planning interval and with the coarse temporal resolution, a power transfer to or from the energy storage system, taking into account a coarse-grained state of charge trajectory of the energy storage system, and wherein the refining of the coarse-grained schedules over the second planning interval at each iteration includes simulating a fine-grained state of charge trajectory of the energy storage system and solving in the second solver module of the lower layer a second constrained optimization problem with the new short-term power generation profiles as inputs and respective portions of the coarse-grained power reference curves for the power consumption by the plurality of scheduled loads and the power transfer to the plurality of loads from the selectively connectable dispatchable energy source by scheduled connections to the dispatchable energy source, and the power transfer to or from the energy storage system by scheduled connections to the energy storage system as optimality constraints.

3. The method according to claim 2, wherein generating portions of the coarse-grained schedules for controlling the plurality of loads, the power transfer to the plurality of loads from the selectively connectable dispatchable energy source and the at least one intermittent energy source, and the power transfer to or from the energy storage system comprises generating the coarse-grained schedule for controlling the plurality of loads, using a simplified version of the energy storage model, before generating the coarse-grained schedules for controlling the power transfer to the plurality of loads from the selectively connectable dispatchable energy source and the at least one intermittent energy source, and the power transfer relative to the energy storage system, in response to an optimized coarse-grained state-of-charge trajectory.

4. The method according to claim 3, further comprising:

providing an initial state of charge of the energy storage system as a further input to the lower layer at each new iteration of said refining of the coarse-grained schedules, by measuring or simulating the state of charge of the energy storage system in accordance with the refined coarse-grained schedules obtained for the iteration of the lower layer preceding said new iteration.

5. The method according to claim 4, further comprising:

iteratively regenerating the coarse-grained schedules in the upper layer at regular intervals, the first planning interval receding by a duration of such regular interval at each repetition, obtaining the state of charge of the energy storage system by measuring or simulating the state of charge in accordance with the refined coarse-grained schedules obtained for a current iteration of the lower layer, and applying the obtained state of charge as a further input to the upper layer when regenerating the coarse-grained schedules in each repetition of the upper layer.

6. The method according to claim 4, wherein the provided model for the energy storage system is a nonlinear equivalent circuit model.

7. The method according to claim 1, further comprising the step of purchasing energy from or selling energy to a utility grid as dispatchable energy source, a price of the energy to be purchased or sold varying dynamically, and wherein purchasing or selling of energy is taking a dynamic energy pricing model into account.

8. The method according to claim 7, wherein an optimality constraint of the first constrained optimization problem comprises an energy reduction term for the energy purchased from the utility grid.

9. The method according to claim 1, wherein providing a forecast of the short-term power generation profile for at least one intermittent energy source comprises measuring a local environmental variable, an internal variable of the intermittent energy source, and applying a forecasting model to the measured local environmental variable or to a measured internal variable of the intermittent energy source.

10. The method according to claim 1,
   wherein the fine temporal resolution corresponds to time steps of an order of one second, or
   wherein the second planning interval corresponds to or is smaller than a time step of the coarse temporal resolution.

11. The method according to claim 2, wherein an optimality constraint of the first constrained optimization problem comprises a modelled lifetime of the energy storage energy storage system.

12. A smart energy management system for locally balancing energy production and consumption in real time, comprising:
   a plurality of controllable loads;
   at least one intermittent energy source;
   a dispatchable energy source selectively connectable with a switch; and
   a processor configured to carry out instructions that, when executed, cause the smart energy management system to perform a method comprising the steps of claim 1.

13. The smart energy management system according to claim 12, wherein the at least one intermittent energy source is a renewable energy source comprising a photovoltaic module or a wind turbine.

14. The smart energy management system according to claim 12, further comprising an energy storage system comprising one or more of a battery, a supercapacitor, a fuel cell, a heat converter, a flying wheel, a water reservoir, or an air compressor.

15. The smart energy management system according to claim 12, further comprising at least one sensor for measuring at least one local environmental variable or at least one internal variable of an intermittent energy source, and wherein the processor is configured for performing the method steps of claim 12.

16. A smart building, smart city cell, or smart vehicle, or smart company plant, or smart car park maintenance comprising the system according to claim 12.

* * * * *